Nov. 15, 1938.    C. C. THOMAS    2,136,476
SEPARATOR
Filed April 12, 1937    4 Sheets-Sheet 2

Inventor:
Carl C. Thomas.
Attorney.

Patented Nov. 15, 1938

2,136,476

UNITED STATES PATENT OFFICE 2,136,476

SEPARATOR

Carl C. Thomas, Pasadena, Calif.

Application April 12, 1937, Serial No. 136,401

15 Claims. (Cl. 183—107)

This invention relates generally to separators adapted to the separation of relatively heavier matter out of a flowing stream of lighter fluid, vapor or gas. As will be understood from the following detailed descriptions, the invention is applicable to many and various uses; but, as it has at present been designed and developed particularly for separation of water from steam, it will be described as used for such purpose, but without limitation thereto.

The general type to which the present invention relates, is shown in my priorly issued Patents, Nos. 1,899,938, Dec. 6, 1932, and 1,924,139, Aug. 29, 1933; and in some of its aspects the present invention may be regarded as improvements upon separator inventions of those patents. The type, as thus shown in Patent No. 1,899,938, is characterized by a means for locally accelerating the fluid velocity, and then changing its direction of flow, so that suspended particles of heavier matter, such as water, are projected out, due to the inertia of the heavier material, in this case liquid water. There is also provided a by-pass arrangement collecting the water which is normally entrained upon the walls of the pipe.

The present invention contemplates many and various improvements upon those previous separators. Most of these improvements, and the corresponding objects and accomplishments of the present invention, will be best understood from the following detailed specification, wherein typical and illustrative embodiments of the invention are set out in particular. It may be preliminarily remarked, that some of the improvements herein described relate to the by-passing and collecting of the wall entrained water, and to the relations of the by-pass to the main fluid passages. Other improvements relate to improved devices and arrangements for forming, regulating, and efficiently maintaining the locally constricted passage at which the fluid velocity is increased; and to the arrangements wherein the fluid velocities are subsequently decreased, and the flow direction changed. Features of improvement reside in adjustability, and means for adjustment, of the mentioned arrangements. And certain other features of improvement have to do with the handling of the collected wall-entrained water, and the water separated at the high velocity jet. And it is a characteristic of the present invention that the separation is fully effected and completed in a very small space and in a very short distance of travel of the fluids; and that, once the separation is so effected, all tendency or opportunity of the steam to pick up, recover or carry along the separated liquid is eliminated.

Further improvements, objects and accomplishments of the invention will be better understood from the following particularized description of preferred and illustrative embodiments, reference for this purpose being had to the accompanying drawings in which.

Figures 1, 1A, 1B, 1C:
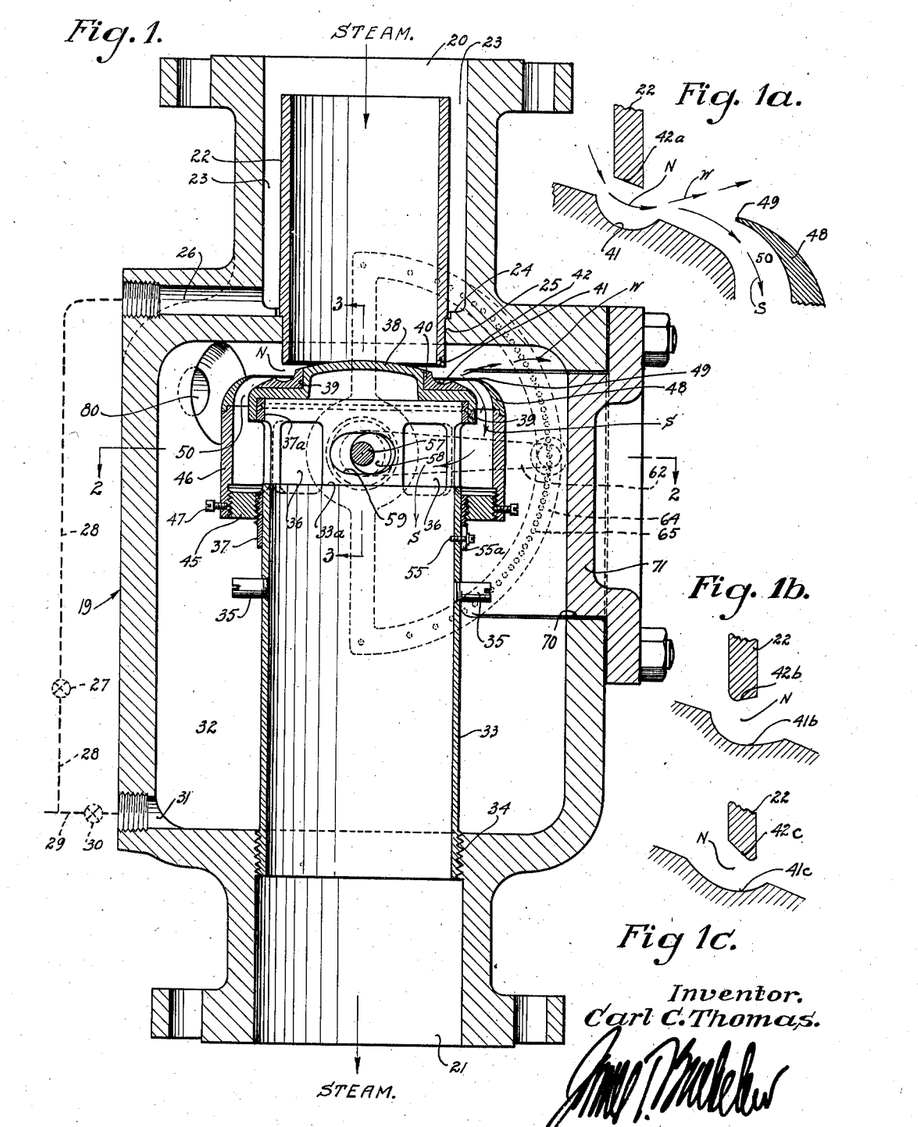
Fig. 1 is a central longitudinal and vertical section showing one form of separator embodying the invention.
Fig. 1a is an enlarged diagrammatic section showing the action at the constricted passage of Fig. 1.
Figs 1b and 1c are similar diagrams showing variations.
Figure 2:
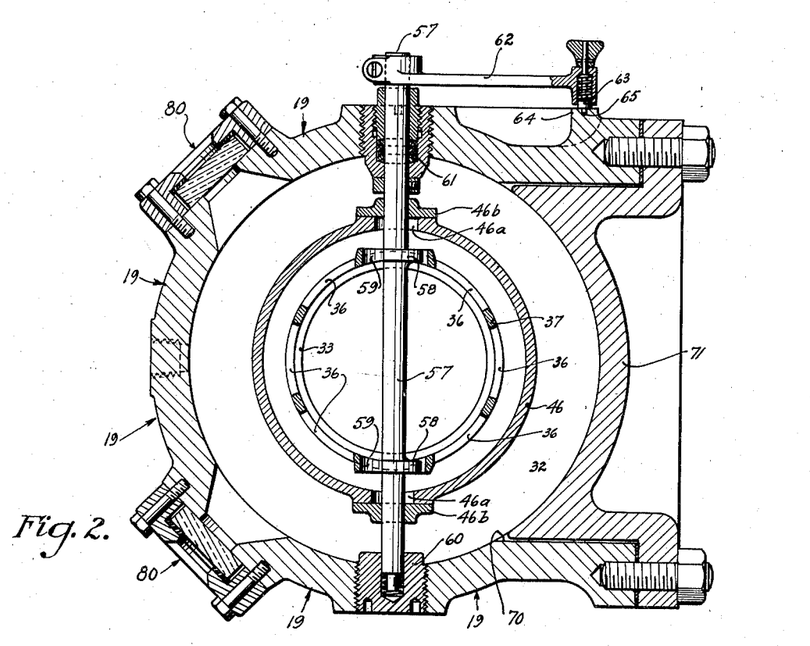
Fig. 2 is a horizontal section taken on line 2—2 of Fig. 1.
Figure 3:
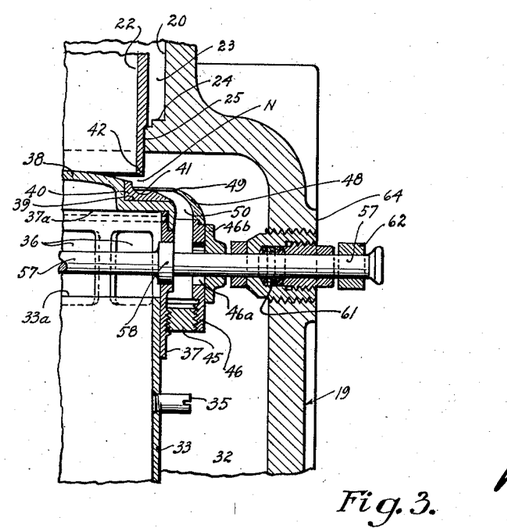
Fig. 3 is a vertical detail section taken on line 3—3 of Fig. 1.

In the form of separator shown in Figs. 1, 2 and 3, there is a suitable outer casing 19 having at its upper end a steam inlet passage 20, and at its lower end a steam outlet passage 21. Inlet passage 20 is preferably cylindric in form, and within and forming a part of this passage is located a nipple or sleeve 22 of somewhat less diameter than passage 20, so that there is left between nipple 22 and the wall of passage 20 an annular space 23, bottomed at 24 where the lower end of the nipple 20 is mounted in the upper wall 25 of the casing 19. The annular space 23 constitutes a pocket into which water adhering to the walls of the steam pipe drops and is isolated. Such wall adherent water, collected in this annular space, may be drawn off through the passage 26. The draw-off of water at 26 may be controlled by valve 27 in the pipe line 28 connected with 26; and this pipe line 28 may discharge its water independently or may be connected with the pipe line 29, controlled by valve 30, which discharges water from the discharge opening 31 from the bottom of main chamber 32 of casing 19, as will be hereinafter described. The pipe lines and valves hereinabove just referred to are merely shown diagrammatically in Fig. 1.

Within the main chamber 32 of casing 19 there is a riser 33, in the form of a nipple screw-threaded at 34 into the casing at the upper end of the final steam outlet passage 21. The screw threads at 34 provide one form and means of adjusting the height of riser 33 and the operating parts carried on its upper end; and for purposes of facilitating such adjustment the riser may be provided with studs 35.

This riser 33 is shown in this design as terminating at an upper end 33a, and at its upper end it carries a ported sleeve 37 which, in effect, forms a vertically adjustable upward continuation of the riser 33. This sleeve 37 is provided with a plurality of circumferentially distributed ports 36 which in normal adjusted operative position lie substantially wholly above the upper end 33a of riser 33. The extreme upper end of the sleeve 37, above ports 36, (the part indicated 37a in Fig. 1) carries a cap or head 38, which may preferably be secured to the sleeve part 37a by means of screws 9, or the like. This cap 38, in general, is convex on its upper face, but its upper face has in it an annular recess 39 for the reception of a removable, changeable and renewable annular nozzle plate 40. This annular nozzle plate has in it an annular groove 41, which annular groove lies directly below the lower edge 42 of the steam inlet passage nipple 22; that lower edge, and the surface of groove 41, forming between them an annular restricted steam passage or nozzle of suitable constriction and configuration to perform the functions hereinafter described. In Fig. 1 the lower edge of nipple 42 is shown as a somewhat beveled or conical surface, and the cross-sectional configuration of the annular groove 41 is shown as circular; but, as will be hereinafter stated, configurations at these edges and surfaces may be as desired.

Screw-threadedly mounted about the lower part of the vertically adjustable sleeve 37, is a mounting ring 45; and screw-threadedly and adjustably mounted on ring 45 is an upwardly extending sleeve 46. Set-screws 47 may be used for setting sleeve 46 in desired adjustment. At its upper end this sleeve 46 has an upwardly and inwardly converging ring 48 with a relatively sharp upper edge 49; and this ring 48 is preferably made of a piece separate from the sleeve 46 proper, so as to be easily changeable and renewable. The upper edge of this annular piece 48 forms, in function, a divider between the streams of water and steam which emerge from the annular nozzle N between 41 and 42, and can thus aptly be termed an annular divider member. Inside this divider member and between it and the periphery of cap 38, there is a curved annular passage 50 through which the separated steam passes downwardly, inside the member 48 and the sleeve 46, and thence inwardly through the ports 36, and thence downwardly through riser 33 to the final steam outlet passage 21. The line of travel of the steam is indicated by the arrows labeled S in Figs. 1 and 1a. The path of the separated water, is indicated by the arrows W. The paths of the steam and water in and about the passages just referred to, are shown in enlarged diagram in Fig. 1a, and will be discussed more fully later.

In addition to the adjustability of the separator sleeve 46 on and with reference to the sleeve 37 and the head 38, the whole assembly of said members is vertically adjustable in position on the riser 33, and with reference to the lower end 42 of inlet nipple 22. Such vertical adjustability of this assembly may be had, if desired, by the vertical adjustment of riser 33 at its screw-threads 34, the sleeve 37 and the stated assembly being set in position on riser 33. A set-screw 55 may be used for such purpose. It is preferred, however, to make this assembly adjustable from the exterior of the casing 19; and for such purpose I show a transverse shaft 57 equipped with eccentrics 58 which play in horizontally elongated slots 59 in the ported sleeve 37. Shaft 57 may have a bearing at one end in a bearing plug 60 threaded into the wall of casing 30, and a bearing at the other end in a packed gland 61, where the shaft passes through to the exterior of casing 19. Exteriorly of the casing the shaft may conveniently have an adjustment arm 62 which carries at its outer end a spring pressed plunger 63 adapted to swing over the face of a sector 64 provided with suitably spaced holes 65 in any one of which the plunger 63 may be set to hold the eccentric shaft 57 in any set position. The sleeve 37, with the parts carried thereby, may thus easily be adjusted in vertical position with reference to the lower edge 42 of inlet nipple 22. For purposes of this adjustment the screw 55 is loose, and a slot 55a in the lower edge of sleeve 37, playing around the screw, holds the sleeve 37 from rotation about riser 33, but allows vertical movement.

At the points where shaft 57 passes through the divider sleeve 46, that member may be provided with circular openings 46a which preferably are not only large enough to take care of the relative movement between that member 46 and the shaft 57, but also large enough to pass the eccentrics 58, for purposes of assembly. In order to close these openings 46a disks of suitable diameter 46b may be mounted on the shaft 57, as indicated.

For purposes of assembly, and for making such adjustments as may require access to the interior, the main casing 19 is provided with a hand hole 70 closed by a cover 71. The inner portion of this cover is preferably shaped so that the cylindric shape of the casing is not broken.

In the operation of the separator of these figures, the steam flows into the device through a pipe which is connected to the steam inlet passage 20. Preferably the passage 20 will be of the same size as the inside diameter of the steam pipe; so that all water which has become entrained on the walls of the steam pipe before reaching the separator will pass on down the walls of inlet passage 20 and into the annular space 23. That water is thus immediately separated from the flow of steam which then passes through the nipple 22, and that water may be drawn off at 26 and by-passed, through the connecting pipe 28, to the water withdrawal pipe at 29.

The stream of steam which passes on down through inlet nipple 22 encounters the head 38 and is deflected to then pass in a relatively thin annular stream under the edge 42 and between that edge and the annular nozzle groove 41 in the head 38. The cross-sectional configuration of groove 41 is such that the stream is turned from its more or less vertical initial path into a more or less horizontal path. The action of change of direction will be readily understood from consideration of Fig. 1a; and it will be readily understood how, when the steam emerges from the nozzle space which I indicated N in that figure, the annular stream as a whole is proceeding horizontally or even horizontally and upwardly, in the general direction indicated by the arrow W. Thus, on emerging from the nozzle N, the whole stream, including the suspended water particles, is travelling outwardly at a relatively high velocity; and the water particles which have acquired that velocity and horizontal direction, are projected on outward in a stream along the line indicated.

The projected stream of water is high enough to clear the upper edge 49 of the annular separator member 48; and the water is thrown outwardly against the outer wall of casing 19, and thence drops down in that casing, outside the separator sleeve 46 and the riser 33 to the bottom of the annular space 32, where the water is withdrawn through outlet 31, as stated.

However, the stream of steam cannot pass into the annular chamber space 32, because there is no withdrawal from, or circulation through, that chamber except that of the separated water. To find its outlet from the separator, the steam must pass into the annular curved passage 50; and in doing so its direction of movement is changed, as indicated by the arrow S in Fig. 1a. In changing its direction of movement, the steam separates itself from the projected water; and also it is to be noted that as soon as the steam has left the restricted annular nozzle N, its velocity immediately falls, while the velocity of the projected water particles is maintained by their inertia. As a consequence, the steam stream, flowing at a much lowered velocity, and flowing downwardly away from the line of projection of the water, does not materially carry the projected water with it. The result is that the steam which is then finally drawn off through the annular passage 50 and thence through the ports 36 and riser 33 to the steam outlet 21, is very effectively freed of water.

There are several adjustabilities and variants having particularly to do with the annular nozzle space N and the immediately cooperating parts.

The effective width of the annular nozzle N may be adjusted to obtain the optimum results. Generally speaking, it is adjusted to obtain that velocity which will best project the water globules through the stream of steam flowing towards ports 36, by way of nozzle N and passage 50 and separate the water, with a minimum drop in steam pressure at the nozzle. The effectiveness of the water separation may be directly observed by using the observation windows 80. Illumination may be projected through one window, and the water separation may then easily and clearly be viewed through the other.

For any given adjustment of the nozzle and for any given projected path W of the water, the annular separator member 48 is adjusted with its upper edge 49 at such an elevation that projected water stream W will just nicely clear it.

The annular nozzle N may be of various configurations. In Figs. 1 and 1a I show a configuration which has been in practical and very successful use. However, the nozzle may be designed so as to have either one curved wall (as for instance the curved wall 41 of the form shown in Fig. 1a) or so as to have two curved walls (as for instance shown in Figs. 1b and 1c), or so as to have either an expanding or contracting form. For instance in Fig. 1b the curved lower edge 42b of nipple 22, and the curved surface 41b of the groove, are shown in such relation as to constitute an expanding nozzle. While in Fig. 1c the two surfaces 42c and 41c are shown in such an arrangement as to constitute a contracting nozzle.

Figures 4, 5, 6:
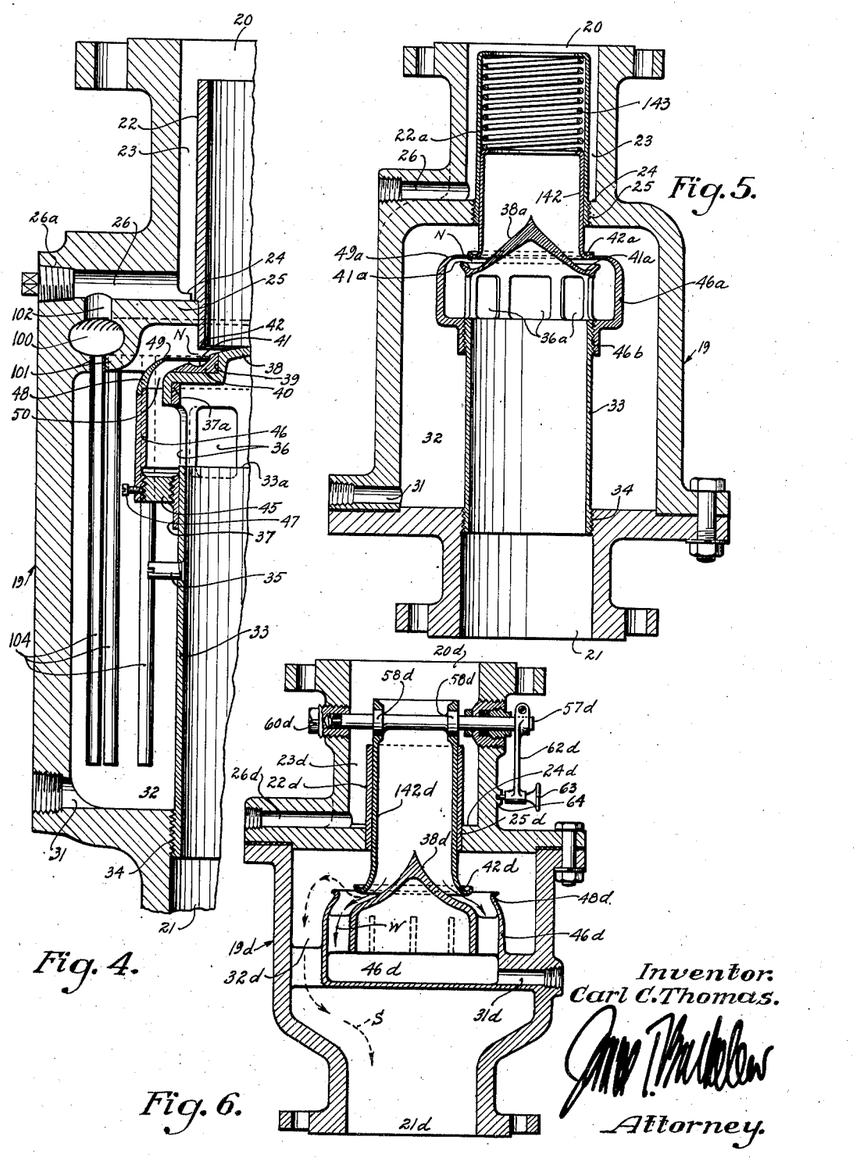
Fig. 4 is a fragmentary vertical section showing certain additions to and modifications of the form of separator shown in Fig. 1.
Figs. 5 and 6 are vertical central sections of other modified forms of separator.

Fig. 5 shows, more or less diagrammatically, and in simple form, a modified structure and design. Here the casing 19 is in essence the same as before described; including the steam inlet passage 20, the annular water space 23 around the nipple 22a, the riser 33, and the steam outlet 21. The riser 33 is, like that of Fig. 1, adjustable vertically at its screwthreads 34; and the annular separator member 46a (here shown in simplified structure) is vertically adjustable on standpipe 33 at the screw-threads 46b. In the simple form here illustrated the cap 38a is mounted directly on the upper end of riser 33, which riser has ports 36a under the cap. The cap 38a is of somewhat different shape from that shown in Fig. 1, being more or less conical; and it has, near its periphery, an annular groove 41a, the bottom of which groove is curved, or, as specifically shown, circular in section. The bottom wall of this groove forms one wall of the annular restricted nozzle through which the steam passes; and the upper wall of this nozzle is formed by the curved annular lower edge 42a of a sleeve 142, which sleeve is vertically movable within the nipple 22a. The spring 143, of suitable compression strength, is located in the upper part of nipple 22a and presses the sleeve 142 down.

In operative features, everything that has been said with regard to the form of Figs. 1, etc., applies also to this form of Fig. 5. In addition, this form of Fig. 5 has the feature of automatic adjustment. Assuming the selection of a suitable spring 143, the steam passing through the annular nozzle space between 42a and 41a will raise 42a to an equilibrium position in which the width of the annular nozzle space is at an optimum value for the quantity of steam flowing through the separator. In other words, the annular nozzle will assume the desired width for any given steam flow and will consequently automatically adjust the parts to optimum operation.

In Fig. 4 I show certain other variations which, although recognizably applicable to the various forms of separator here described, are specifically and illustratively shown in connection with the separator form of Fig. 1. The variations which form the subject matter of Fig. 4 and the following description, have more particularly to do with the handling of the separated water, and with additional or varying uses to which the separator may be put.

In Fig. 4 the main structure of the separator is the same as that shown in Fig. 1, corresponding numerals being applied to corresponding parts.

In Fig. 4 I show a header passage 100 which extends circularly around the top of chamber 32 in casing 19; and this header passage may have a plurality of spaced apertures 101 in its bottom wall. The header passage is connected, as by passage 102, with the liquid passage 26, which communicates with annular space 23. Wall entrained water accumulating in annular space 23 passing out through passage 26 into the header passage 100, may pass out of 100 directly through openings 101 and be showered down through the more or less quiescent body of steam standing in chamber 32. This water, showering down, has a tendency to gather and carry down with it water particles which have been thrown from the nozzle N into the upper part of chamber 32. The action is thus to more quickly remove the water from the zone of separation. On the other hand, depending tubes such as illustrated at 104, may carry the water down from header passage 100. The wall entrained water is normally at a somewhat lower temperature than is the body of steam passing through the pipes and the separator. Consequently this water, passing through tubes 104, gives those tubes a slight condenser action. And the water is thrown out from nozzle N into the upper part of chamber 32 in fine misty particles is more or less coalesced on the cooler tubes and then readily run down to the lower part of the chamber. Or, either of the operations described above can be looked at in this way: that the introduction of the somewhat cooler water from wall entrainment, to the chamber 32, causes a slight condensation of steam in that chamber, as well as a more thorough condensation and coalescing of the water particles; and by such condensing action a slow flow is set up toward the bottom of chamber 32, carrying down the water and moving it away from the zone of separation.

Furthermore, additional cooling water, or any other suitable fluid, may be introduced to passage 26 and header passage 100 at the opening 26a.

Another use to which these separators may be put is illustrated by the following. If, in Fig. 1, the passage 26 were plugged as shown in Fig. 4, or otherwise closed, the wall entrained water would first accumulate until it filled annular space 23, and then would overflow the upper edge of nipple 22 and flow down the inside wall surface of that nipple. Upon reaching the lower edge 42 of the nipple, that water would then be carried into the high velocity nozzle, and would be admixed and thrown out, along with the water carried in the body of the steam, in the manner before described. And it may be advantageous to do this in the operation of a steam separator, as the larger particles or masses of water, which originate as wall entrainment, may materially assist in gathering together the small and mist-like particles, and causing them to be thrown out at the high velocity nozzle.

And in uses of the separator applied to fluids other than steam and water, such an operation may also be desirable. For instance, take the case of a gas which carries a condensible vapor or carries a liquid in a mist-suspension. A good example of this is natural gas which carries a considerable quantity of volatile hydrocarbons in vapor and mist form. In such a case an absorbing liquid may be introduced at 26, to flow down the inner wall of 22 and into the high velocity nozzle. In the nozzle the absorbing liquid will be thoroughly admixed with the gases and mist. And the absorbing liquid, together with its picked up load of absorbable fluids, will be finally thrown out and separated from the gas stream in the same manner as before described.

Fig. 6 shows another modified form wherein the casing 19d is substantially the same as in Fig. 1; being provided with the upper inlet 20d and lower outlet 21d and also with the annular space 23d to catch the wall entrained water. A sleeve 22d forms the inner wall of space 23d, and a vertically adjustable steam passage sleeve 142d is slidably mounted in sleeve 22d. At its upper end this sleeve 142d is provided with an adjustment device similar to that shown in Figs. 1 to 3, comprising shaft 57d, eccentrics 58d and exterior adjustment arm 62d. The lower end of 142d has an annular lip 42d of curved cross-section forming one wall of the annular nozzle. The other wall of that nozzle is formed by the upper wall of cap 38d, substantially conical but shown with convex curvature.

The arrangement here is such that the annular nozzle points somewhat downwardly; the line of liquid projection is indicated by the arrows W. The annular separator edge 48d of the water gathering cup 46d is in this case located above the projected water stream, instead of below it as in Fig. 1. The steam, or equivalent fluid, after passing through the restricted annular nozzle between 42d and 38d, turns upward to pass through the relatively larger annular opening between 42d and 48d, and into the main chamber 32d of casing 19d. The steam passes downward around the water cup 46d and to the outlet 21d. Water is withdrawn at 31d.

The similarities between this form and the others will be readily recognized and need not be recapitulated. The characteristic feature of this form lies in the fact that water or other liquid (and this is particularly advantageous where that liquid happens to be more or less viscous) which is projected or carried down through inlet 142d by the steam, gas or vapor, against the surface of cap 38d, can continue to travel down that surface and does not have to be thrown or projected off of it in order to find the water outlet. And the liquid travelling down that surface does not, to reach the water outlet, have to be projected through or across a stream of the steam, etc.

Figures 7, 8, 9:
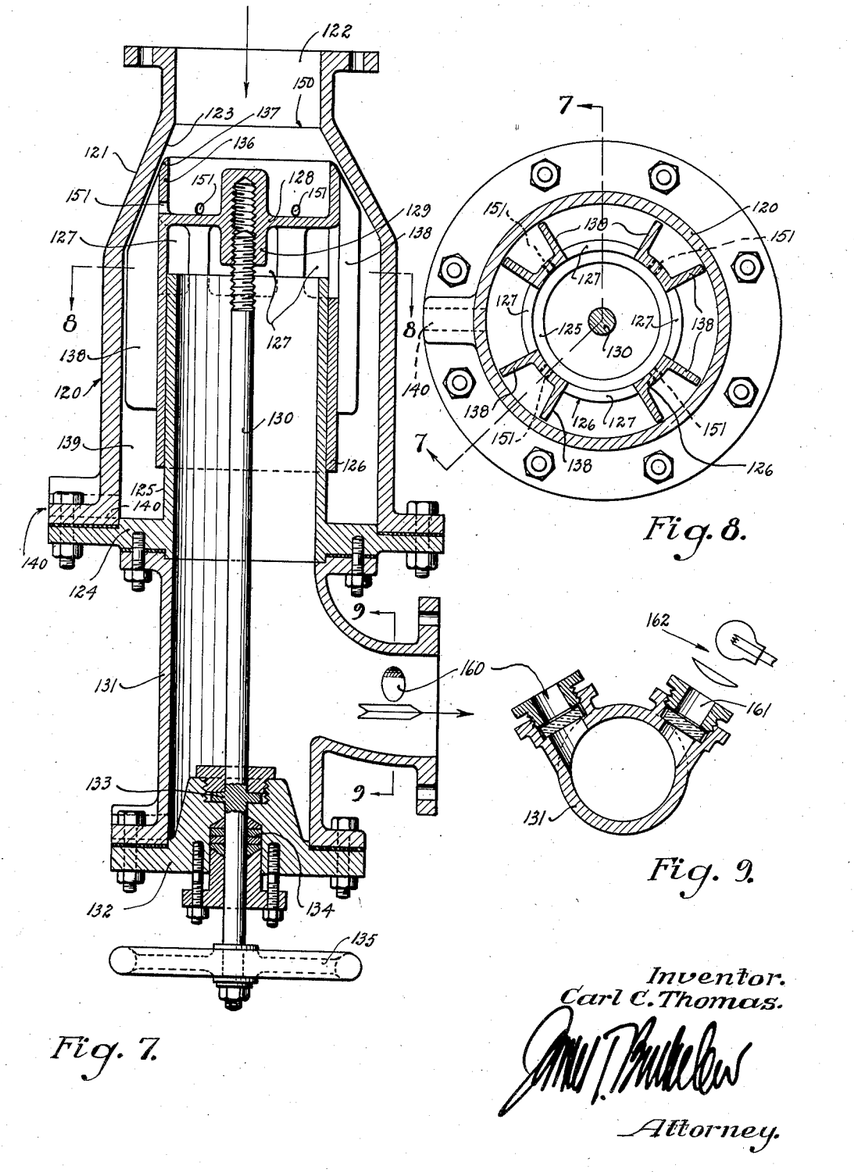
Fig. 7 is a vertical central section of another modified form of separator.
Fig. 8 is a section taken on line 8—8 of Fig. 7.
Fig. 9 is a section taken on line 9—9 of Fig. 7.

In Figs. 7, 8 and 9 I show another form which my invention may take. In these figures the body or casing, indicated at 120, has an upper frusto-conical part 121, at the upper end of which is the steam inlet passage 122. The inner conical surface 123 of the conical part 121, forms one wall of the restricted annular nozzle passage, as will be hereinafter understood. Casing 120 has a flanged bottom 124 from which rises the riser 125. Vertically slidable upon this riser 125 is the sleeve 126 which, at a point substantially above the upper end of standpipe 125, has the ports 127. The upper part of sleeve 126 is provided with a head 128 and with a screw-threaded boss or hub 129. A screw-threaded rod 130 engages the screw-threaded hub 129 and serves to adjust vertically the position of sleeve 126. Rod 130 extends downwardly through the interior of standpipe 125 and hence through the interior of the steam outlet fitting 131. At the bottom of this outlet fitting 131, the rod 130 passes through a head 132, within which the rod has a thrust bearing 133, and is provided with a packing gland 134. The hand wheel 135 facilitates rotation of the rod and consequent adjustment of vertical position of sleeve 126.

Sleeve 126 extends at its upper end above head 128, as shown at 136; and its upper edge is preferably more or less beveled, as shown at 137, to a surface more or less parallel with the conical surface 123. At the vertical edges of the ports 127 the sleeve is provided with vanes 138 whose outer edges conform substantially to the inner configurations of casing 120.

The annular chamber 139, within the casing 120 and surrounding the riser 125, forms the isolated annular water accumulation chamber for the water which has been separated from the steam; the steam flow being downwardly within the standpipe 125. At 140 is indicated an outlet for the water from chamber 139.

In the operation of this device the general line of steam flow is indicated by the arrows. Steam entering at the inlet 122 has to pass through the restricted annular nozzle space between the sleeve edge 137 and the conical wall 123. In this adjustably restricted annular space the velocity of the fluid stream is much increased; with the result that the water content of the stream is thrown on downward and outward in the direction of the high velocity stream; that is, downward and outward along the conical wall 123. Immediately after passing the restricted annular nozzle the steam falls in velocity and changes in direction of movement to move more directly downwardly and then inwardly to and through the sleeve ports 127. The annular chamber 139 being of ample cross-sectional area, the steam velocity below the restricted annular nozzle is comparatively low and the body of steam standing in the annular chamber 139 below the ports 127 is comparatively quiescent. The separated water consequently runs on down the inner surface of the wall of casing 120, or drops down through the annular chamber 139, to the bottom, where it is withdrawn at outlet 140.

The wall entrained water which comes down the steam pipe above inlet 122, and runs down the wall of inlet 122, may drop off or be blown off that wall at the angle line 150 at the upper end of conical surface 123. If the angle at the line 150 is comparatively sharp all or most water will there drop off and drop into the cup, which is formed on the upper end of sleeve 126 by the head 128 and the flange wall 136 hereinbefore described. From this cup the water has egress through such openings as are indicated at 151, which openings are located between pairs of adjacent vanes 138 in such positions that the openings are not over the spaces which communicate with the sleeve ports 127. Thus the wall entrained water gathered at the upper end of sleeve 126 may flow down the outer surface of that sleeve between and protected by the vanes 138 so that it will not be picked up by the steam flow and carried out through the ports.

On the other hand, if the angle at the line 150 is made less sharp, some or most of the water, instead of dropping off at that point may be carried by the steam flow on down along the conical wall 123 to enter the restricted annular nozzle along with the other fluids. Here, admixed with those fluids, it will be thrown out of the steam along with other water carried by the steam, in the same manner as before described for other forms of the invention.

In the form of Fig. 7 I have shown, in Fig. 9, the application and use of illumination and sight openings 160, 161; and have shown diagrammatically the illumination system 162 that may be used. The arrangement shown here is substantially the same as that shown in Figs. 1 and 2, except that here the provision is made that the steam after separation may be inspected, while in Fig. 1 inspection of the action of separation is facilitated. It will be understood that either of these inspection arrangements may be applied to any of the forms of separator.

Forms of devices which I have here described are intended to be merely illustrative and indicative of the invention, and the invention is not limited to those forms, or to any of the specific details herein described, except as is expressly so stated in the following claims.

I claim:

1. A separator of the type described, comprising an outer casing having a fluid inlet passage at one end, a fluid outlet pipe projecting into the casing from the other end and forming the inner wall of an annular separation chamber within the casing, said separation chamber having an outlet, means forming between the fluid inlet passage and the fluid outlet pipe a restricted annular fluid passage in open and direct communication with the annular separation chamber and in which the fluid is directed in a high velocity stream transversely outwardly of the inlet passage and the outlet pipe into the annular separation chamber, and passage forming means enclosing an annular passage communicating with the interior of the outlet pipe and having an annular intake opening surrounding and immediately adjacent the restricted annular fluid passage.

2. A separator of the type described, comprising an outer casing having a fluid inlet passage at its upper end, a fluid outlet pipe projecting upwardly into the casing from its lower end, co-axial with the fluid inlet passage, and forming the inner wall of an annular liquid separation chamber within the casing, said separation chamber having an outlet at its lower end, means at the upper end of the fluid outlet pipe forming a restricted annular nozzle at the lower end of the inlet passage in open and direct communication with the annular separation chamber and directing the fluid in a high velocity stream outwardly and radially of the inlet passage into the upper part of the separation chamber, and passage forming means enclosing an annular passage communicating with the interior of the outlet pipe and having an annular intake opening surrounding and immediately adjacent the restricted annular fluid passage.

3. A separator of the type described, comprising an outer casing having a fluid inlet passage at its upper end, a fluid outlet pipe projecting upwardly into the casing from its lower end, co-axial with the fluid inlet passage, and forming the inner wall of an annular liquid separation chamber within the casing, said separation chamber having an outlet at its lower end, vertically adjustable means at the upper end of the fluid outlet pipe forming a restricted adjustable annular nozzle at the lower end of the inlet passage in open and direct communication with the annular separation chamber and directing the fluid in a high velocity stream outwardly and radially of the inlet passage into the upper part of the separation chamber, and passage forming means enclosing an annular passage communicating with the interior of the outlet pipe and having an annular intake opening surrounding and immediately adjacent the restricted annular fluid passage.

4. A separator of the type described, comprising an outer casing having a fluid inlet passage at its upper end, a fluid outlet pipe projecting upwardly into the casing from its lower end, co-axial with the fluid inlet passage, and forming the inner wall of an annular liquid separation chamber within the casing, said separation chamber having an outlet at its lower end, a vertically adjustable head structure mounted on the upper end of the outlet pipe, said structure including a ported sleeve slidable on the pipe, an upper element having an annular surface which in cooperation with a wall of the inlet passage forms an adjustable annular restricted nozzle in open and direct communication with the annular separation chamber and directing fluid from the inlet passage outwardly into the separation chamber, separation chamber, and passage forming means enclosing an annular passage communicating with the interior of the outlet pipe and having an annular intake opening surrounding and immediately adjacent the restricted annular fluid passage.

5. A separator of the type described, comprising an outer casing having a fluid inlet passage at its upper end, a fluid outlet pipe projecting upwardly into the casing from its lower end, coaxial with the fluid inlet passage, and forming the inner wall of an annular liquid separation chamber within the casing, said separation chamber having an outlet at its lower end, a vertically adjustable head structure mounted on the upper end of the outlet pipe, said structure including a ported sleeve slidable on the pipe, and an upper element having an annular surface which in cooperation with a wall of the inlet passage forms an adjustable annular restricted nozzle directing fluid from the inlet passage outwardly into the separation chamber, and means operable exteriorly of the casing to adjust said vertically adjustable head structure.

6. A separator of the type described, comprising an outer casing having a fluid inlet passage defined by an annular wall, a structure including a head element having an annular surface which in cooperation with the inlet passage wall forms an annular restricted nozzle directing the fluid from the inlet outwardly transversely of the inlet in a high velocity jet, an annular separator wall spaced inwardly from the casing to form a low velocity outer annular passage and spaced outwardly from the head element to form an inner annular passage, the end edge of the separator wall forming a separator edge located substantially at the boundary of the high velocity jet projected from the nozzle, and fluid outlets for the two annular passages.

7. A separator of the type described, comprising an outer casing having a fluid inlet passage defined by an annular wall, a structure including a head element having an annular surface which in cooperation with the inlet passage wall forms an annular restricted nozzle directing the fluid from the inlet outwardly transversely of the inlet in a high velocity jet, an annular separator wall spaced inwardly from the casing to form a low velocity outer annular passage and spaced outwardly from the head element to form an inner annular passage, the end edge of the separator wall forming a separator edge located substantially at the boundary of the high velocity jet projected from the nozzle, and fluid outlets for the two annular passages, and means for adjusting the head element and the inlet passage wall with respect to each other to adjust the size of said annular nozzle.

8. A separator of the type described, comprising an outer casing having a fluid outlet and having a fluid inlet defined by an annular wall, a structure including a ported sleeve whose interior communicates with the outlet, a head element at one end of the sleeve and having an annular surface cooperating with the annular inlet wall to form an annular restricted nozzle directing the fluid from the inlet in a radially directed high velocity jet into the interior of the casing, and an annular separator element spacedly surrounding the ported sleeve and spaced substantially from the outer casing, enclosing an annular passage around it communicating with the sleeve ports and having an end edge which lies in proximity to the jet projected from said nozzle.

9. A separator of the type described, comprising an outer casing having a fluid outlet and having a fluid inlet defined by an annular wall, a structure including a ported sleeve whose interior communicates with the outlet, a head element at one end of the sleeve and having an annular surface cooperating with the annular inlet wall to form an annular restricted nozzle directing the fluid from the inlet in a radially directed high velocity jet into the interior of the casing, an annular separator element spacedly surrounding the ported sleeve and spaced substantially from the outer casing, enclosing an annular passage around it communicating with the sleeve ports and having an end edge which lies in proximity to the jet projected from said nozzle, and means for adjusting the said structure and the inlet passage wall with relation to each other to adjust the size of said annular nozzle.

10. In a separator of the type described, an outer casing enclosing a chamber and having at its upper end a fluid inlet passage, a fluid inlet nipple located in the inlet passage and forming between it and the passage wall an annular liquid chamber, a passage communicating with said liquid chamber and through which liquid may be withdrawn from or introduced to said chamber, the lower end of the nipple projecting downwardly into said main chamber, a fluid outlet for the main chamber, a liquid outlet at the lower part of the main chamber, and means within the chamber cooperating with the lower end of the inlet nipple to form a restricted annular nozzle directing fluid from the inlet outwardly in an annular stream.

11. In a separator of the type described, an outer casing enclosing a chamber and having at its upper end a fluid inlet passage, a fluid inlet nipple located in the inlet passage and forming between it and the passage wall an annular liquid chamber, a passage communicating with said liquid chamber and through which liquid may be withdrawn from or introduced to said chamber, the lower end of the nipple projecting downwardly into said main chamber, means within the chamber cooperating with the lower end of the inlet nipple to form a restricted annular nozzle directing fluid from the inlet outwardly in an annular stream, an annular separator member within the casing spaced from said nozzle and from the casing wall, and fluid outlets from the interior of the separator member and from the casing exterior of the separator member.

12. In a separator of the type described, an outer casing enclosing a chamber and having at its upper end a fluid inlet passage, a fluid inlet nipple located in the inlet passage and forming between it and the passage wall an annular liquid chamber, a passage communicating with said liquid chamber and through which liquid may be withdrawn from or introduced to said chamber, the lower end of the nipple projecting downwardly into said main chamber, a fluid outlet pipe projecting up into the main chamber from its bottom and defining around it an annular liquid separation chamber, and a head structure carried by the upper end of the outlet pipe and embodying a ported sleeve, a surrounding wall member that encloses an annular passage space around the ported sleeve and open at its upper end, and a head member having an annular surface that cooperates with the lower end of the inlet nipple to form a restricted annular nozzle which directs fluid from the inlet outwardly from the inlet nipple.

13. In a separator of the type described, an outer casing enclosing a chamber and having at its upper end a fluid inlet passage, a fluid inlet nipple located in the inlet passage and forming between it and the passage wall an annular liquid chamber, a passage communicating with said liquid chamber and through which liquid may be withdrawn from or introduced to said chamber, the lower end of the nipple projecting downwardly into said main chamber, a fluid outlet pipe projecting up into the main chamber from its bottom and defining around it an annular liquid separation chamber, and a head structure carried by the upper end of the outlet pipe and embodying a ported sleeve, a surrounding wall member that encloses an annular passage space around the ported sleeve and open at its upper end, and a head member having an annular surface that cooperates with the lower end of the inlet nipple to form a restricted annular nozzle which directs fluid from the inlet outwardly from the inlet nipple, said head structure being vertically adjustable in position, and said wall member being vertically adjustable with reference to the head member.

14. In a separator of the type described, an outer casing enclosing a chamber, a wall defined inlet passage leading down into the chamber, an outlet pipe extending up into the chamber from its bottom and co-axial with the inlet passage, a vertically adjustable ported head structure on the upper end of the outlet pipe, said structure having a head which lies directly under the lower end of the inlet passage and which has an annular surface that cooperates with the wall of the inlet passage to form an annular restricted nozzle, and said head structure also including a wall which spacedly surrounds it and forms an annular passage open at its upper end adjacent said head.

15. In a separator of the type described, walls forming a high velocity nozzle passage from which wet fluids introduced thereto are projected in a restricted high velocity stream in a definite direction, a separator wall having a separator edge lying substantially at a lateral boundary of the high velocity stream and spaced from the discharge end of a nozzle wall, in a direction longitudinal of the high velocity stream, to form at one side of the separator edge a dry fluid discharge opening through which dry fluid flows in a direction transverse of the stream, and other walls forming, at the other side of the separator edge, a liquid discharge opening in direct line with the high velocity stream and a liquid discharge passage which leads away from said liquid discharge opening in the direction of said stream; and means for introducing wet fluids to the nozzle including a feed pipe, a nipple within the feed pipe communicating with the nozzle and forming an inner wall of a liquid chamber of which the feed pipe forms the outer wall, and means to remove liquid from or introduce liquid to the liquid chamber.

CARL C. THOMAS.